(12) United States Patent
Irving

(10) Patent No.: US 11,604,296 B2
(45) Date of Patent: Mar. 14, 2023

(54) SEISMIC SOURCE WITH CHAMBER FOR HOUSING WAVE GENERATOR

(71) Applicant: PGS Geophysical AS, Oslo (NO)

(72) Inventor: Rick Irving, Perth (AU)

(73) Assignee: PGS Geophysical AS, Oslo (NO)

( * ) Notice: Subject to any disclaimer, the term of this patent is extended or adjusted under 35 U.S.C. 154(b) by 504 days.

(21) Appl. No.: 16/787,945

(22) Filed: Feb. 11, 2020

(65) Prior Publication Data

US 2020/0264326 A1 Aug. 20, 2020

Related U.S. Application Data

(60) Provisional application No. 62/808,139, filed on Feb. 20, 2019.

(51) Int. Cl.
*G01V 1/145* (2006.01)

(52) U.S. Cl.
CPC ...... *G01V 1/145* (2013.01); *G01V 2210/1293* (2013.01)

(58) Field of Classification Search
CPC .......... G01V 1/02; G01V 1/137; G01V 1/145; G01V 1/38; G01V 1/387
See application file for complete search history.

(56) References Cited

U.S. PATENT DOCUMENTS

| | | | | |
|---|---|---|---|---|
| 3,525,416 A | * | 8/1970 | Morton | G01V 1/387 181/115 |
| 5,233,570 A | * | 8/1993 | Donskoy | G01V 1/38 367/176 |
| 5,572,486 A | | 11/1996 | Landro et al. | |
| 6,230,840 B1 | * | 5/2001 | Ambs | G01V 1/38 367/141 |
| 8,261,874 B2 | * | 9/2012 | Hopperstad | G01V 1/133 181/102 |
| 8,427,901 B2 | | 4/2013 | Lunde et al. | |
| 8,596,409 B2 | * | 12/2013 | Parkes | G01V 1/133 181/120 |
| 8,687,464 B2 | * | 4/2014 | Thompson | G01V 1/137 367/148 |
| 9,618,637 B2 | * | 4/2017 | Tenghamn | G01V 1/145 |
| 2014/0334254 A1 | * | 11/2014 | Zrostlik | G01V 1/145 367/15 |
| 2014/0340983 A1 | | 11/2014 | Parkes et al. | |

(Continued)

FOREIGN PATENT DOCUMENTS

| | | |
|---|---|---|
| EP | 2283384 | 2/2011 |
| GB | 2495601 | 4/2013 |

OTHER PUBLICATIONS

Landro, et al., Marine Seismic Sources Part 1, Technology GEO ExPro, 2010.

(Continued)

*Primary Examiner* — Jeremy A Luks

(57) ABSTRACT

This disclosure is related generally to marine surveying. An apparatus for generation of seismic waves in a body of water may include a wave generator. The apparatus may further include a housing defining an internal chamber having an open end. The housing may include baffles positioned between the open end and the wave generator. The housing may further include a vent positioned on an opposite end of the housing from the baffles.

20 Claims, 6 Drawing Sheets

(56) References Cited

U.S. PATENT DOCUMENTS

2015/0096830 A1\* 4/2015 Jung .................. G10K 11/16
 181/205
2018/0128927 A1\* 5/2018 Tenghamn ............. G01V 1/005

OTHER PUBLICATIONS

P.M. Krail, Airguns: Theory and operation of the marine seismic source, UTA, 2010.
ISRWO for Application No. PCT/EP2020/054471 dated Jul. 24, 2020.

\* cited by examiner

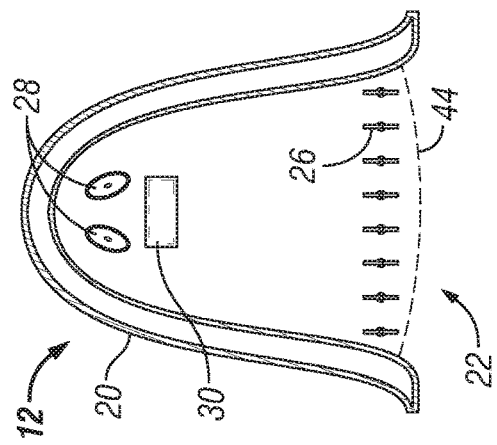
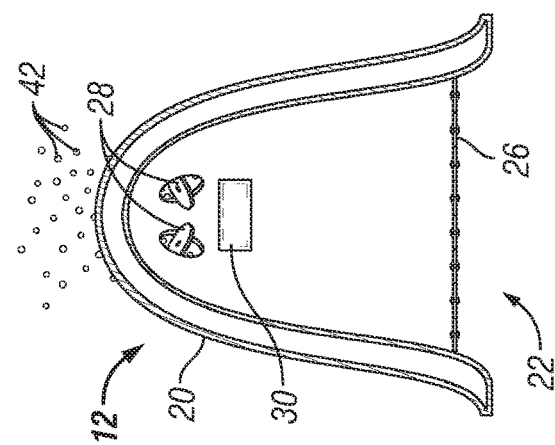
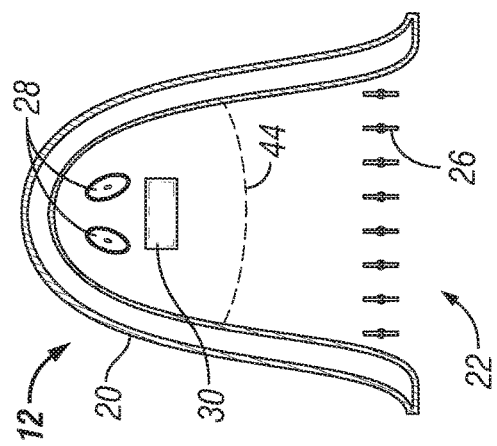
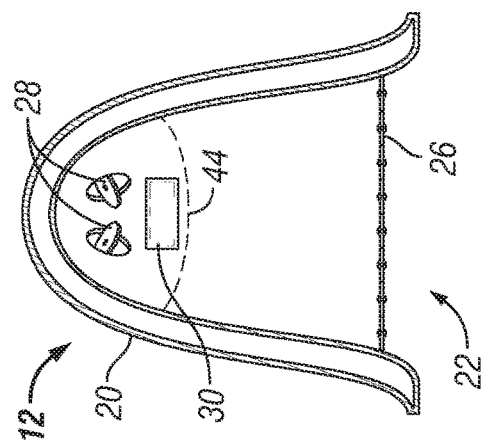
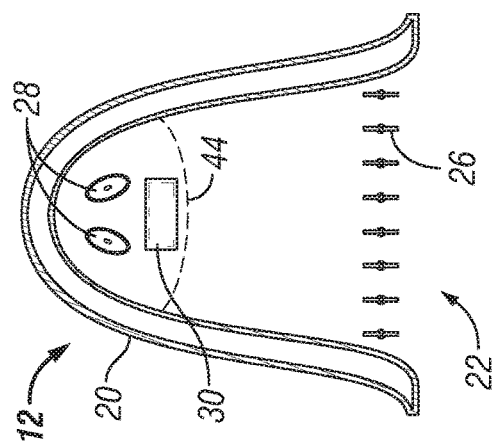
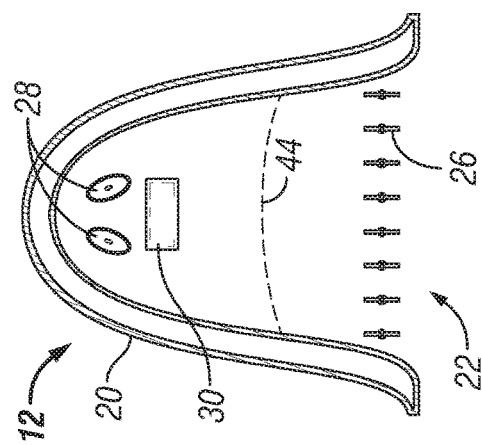

SEISMIC SOURCE WITH CHAMBER FOR HOUSING WAVE GENERATOR

CROSS REFERENCE TO RELATED APPLICATIONS

This application claims priority to U.S. Provisional Application No. 62/808,139, entitled Conical Shaped Chamber for Housing Seismic Source Elements, filed Feb. 20, 2019, the disclosure of which is incorporated herein by reference.

BACKGROUND

Techniques for marine surveying include marine geophysical surveying, such as seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth typically above the seafloor in a body of water. One or more geophysical sensor streamers also may be towed in the water at selected depths by the same or a different vessel. The streamers are typically cables that include a plurality of geophysical sensors disposed thereon at spaced apart locations in the axial direction along the length of the cable. The geophysical sensors may be configured to generate a signal that is related to a parameter being measured by the sensor. At selected times, the energy source may be actuated to generate, for example, seismic or electromagnetic ("EM") energy that travels downwardly into the subsurface rock. Energy that interacts with interfaces, generally at the boundaries between layers of rock formations, may be returned toward the surface and detected by the geophysical sensors on the streamers. The detected energy may be used to infer certain properties of the subsurface rock, such as structure, mineral composition and fluid content, thereby providing information useful in the recovery of hydrocarbons.

One type of marine source often used in marine surveys includes an array of air guns. An acoustic signal may be generated by simultaneously activating the air guns. The air guns generate separate pressure wavefields that combine to form a total pressure wavefield. This wavefield is an acoustic signal that radiates outward in all directions. A portion of the wavefield travels directly from the source through the body of water and into the subterranean formation, and a portion of the wavefield travels upward to the free surface before being reflected downward from the free surface to the subterranean formation. The reflected portion of the wavefield is called the "source ghost" because the reflected portion is time-delayed and travels behind the direct portion of the wavefield. At each interface between different types of rock or sediment of the subterranean formation a portion of the source wavefield energy is refracted, a portion is transmitted, and a portion is reflected back toward the formation surface and into the body of water.

The seismic data is processed with seismic data processing techniques that depend on highly accurate estimates of the source wavefield in order to effectively remove source wavefield effects from the seismic data and ultimately generate high-resolution seismic images of the subterranean formation. Any errors in an estimate of the source wavefield lowers the signal to noise ratio and general quality of the seismic images. When the air guns of a source array towed behind a vessel are simultaneously activated, air bubbles created by the air guns in previous activations do not substantially affect estimates of the source wavefield from the current activation, because the air-bubbles remaining in the water from previous activations are behind the current position of the source due to forward motion of the source. On the other hand, when the air guns within a source array towed behind a vessel are activated at different times with short time intervals (e.g., a few seconds or less), the water column surrounding a next to be activated air gun may be filled with air bubbles created by one or more neighboring, previously activated air guns. The air-bubbles create very complex and unpredictable effects on the wavefield emitted by the next to be activated air gun. As a result, an estimate of a source wavefield may not accurately characterize the source wavefield generated by the air guns.

BRIEF DESCRIPTION OF THE DRAWINGS

These drawings illustrate certain aspects of some of the embodiments of the present disclosure and should not be used to limit or define the disclosure.

FIGS. 5A to 5F illustrate operation of a chamber during an actuation of a seismic source according to some embodiments of the present disclosure.

DETAILED DESCRIPTION

Figure 1A:
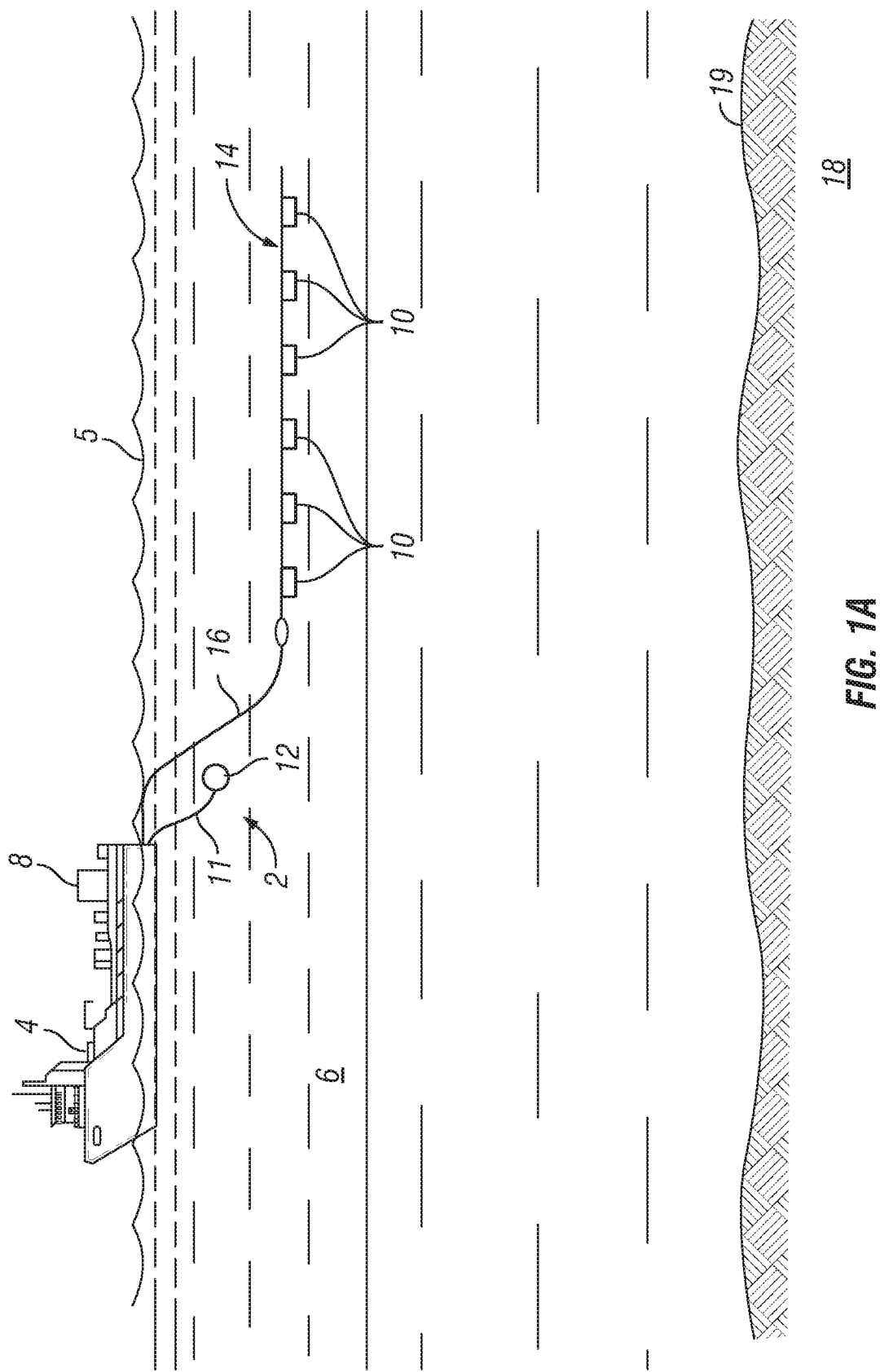
FIGS. 1A and B illustrate a side view and top view, respectively, of an example embodiment of marine geophysical survey system.

This disclosure is related generally to marine surveying. Marine surveying may include, for example, seismic and/or electromagnetic surveying, among others. Aspects of this disclosure may have applications in marine surveying, in which one or more sources are used to generate wave-fields, wherein receivers—either towed or ocean bottom—receive energy generated by the sources and affected by the interaction with the subsurface formation.

Acquisition of seismic data is becoming increasingly restricted spatially and temporally due to impacts of sound levels on both site-attached and migratory marine fauna. Environmental permits and concerns about sensitive environmental receptors (for example, foraging whales, site attached fish) are starting to limit spatial and temporal extents of a marine seismic survey, in part due to side-emitted energy. One or more embodiments of the present disclosure enables energy output from one or more seismic source elements to be focused, resulting in reduced emission of side energy. Some previous approaches to air gun arrays may release side-propagated sound energy that impacts the environment and affects environmental assessments. One or more embodiments of the present disclosure may reduce side-propagating sound energy. Other embodiments of the present disclosure may reduce source ghosts, reduce bubble energy, improve signal bandwidth, and combinations thereof.

It is to be understood the present disclosure is not limited to particular devices or methods, which may, of course, vary. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In the following description, numerous details are set forth to provide an understanding of the present disclosure. However, it will be understood by those of ordinary skill in the art that the present disclosure may be practiced without these details and that numerous variations or modifications from the described embodiments may be possible. The disclosure will now be described with reference to the figures, in which like reference numerals refer to like, but not necessarily the same or identical, elements throughout. For purposes of clarity in illustrating the characteristics of the present disclosure, proportional relationships of the elements have not necessarily been maintained in the figures.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 1B:
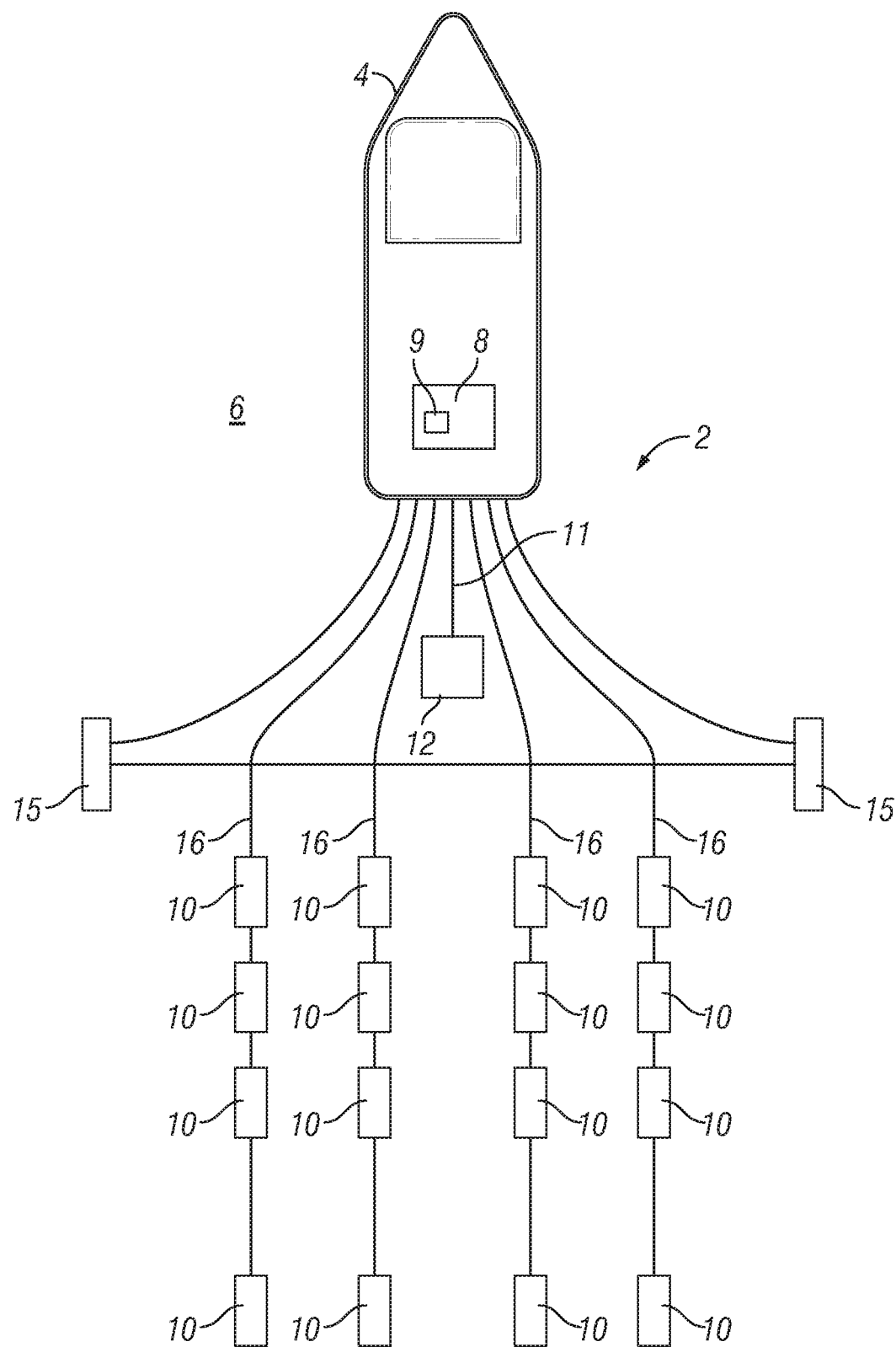

FIGS. 1A and 1B illustrate a side view and top view, respectively, of a marine geophysical survey system 2 in accordance with example embodiments. Marine geophysical survey system 2 may include a survey vessel 4 that moves along a surface 5 of a body of water 6, such as a lake or ocean. The survey vessel 4 may include thereon equipment, shown generally at 8 and collectively referred to herein as a "recording system." The recording system 8 may include devices (none shown separately) for detecting and making a time indexed record of signals generated by each of seismic sensors 10 and/or for actuating at least one seismic source 12 at selected times. The recording system 8 may also include devices (none shown separately) for determining the geodetic position of the survey vessel 4 and the various geophysical sensors 10.

The survey vessel 4 or a different vessel (not shown) may tow a source cable 11 that includes the one or more seismic source 12. In other embodiments (not shown), one or more of the seismic source 12 may be mounted to the hull of the survey vessel 4. The seismic source 12 may be any selectively actuatable sources suitable for subsurface geophysical surveying, such as electromagnetic sources and seismic sources, including without limitation, seismic air guns, water guns, marine acoustic vibrators or arrays of such devices.

As illustrated, the survey vessel 4 may tow one or more sensor streamers 14. The sensor streamers 14 may be towed in a selected pattern in the body of water 6 by the survey vessel 4 or a different vessel. In some embodiments, the sensor streamers 14 may be formed, for example, by coupling a plurality of streamer segments (none shown separately). The sensor streamers 14 may be maintained in a selected pattern by spreading device 15 (shown on FIG. 1B), such as paravanes or doors, that provide lateral force to spread the sensor streamers 14 to selected lateral positions with respect to the survey vessel 4. The sensor streamers 14 may have a length, for example, in a range of from about 2,000 meters to about 12,000 meters or longer. The sensor streamers 14 may include seismic sensors 10 thereon at spaced apart locations in the axial direction. The type of the seismic sensors 10 is not a limit on the scope of the present disclosure and may be particle motion-responsive geophysical sensors such as geophones, accelerometers, pressure-responsive geophysical sensors such as hydrophones, pressure time gradient-responsive geophysical sensors, or combinations of the foregoing. The configurations of the sensor streamers 14 on FIGS. 1A and 1B are provided to illustrate example embodiments and is not intended to limit the present disclosure.

Lead-in lines 16 may couple the sensor streamers 14 to the survey vessel 4. In the illustrated embodiment, the lead-in lines 16 may include a cable. In some embodiments, the sensor streamers 14 may be towed near the surface 5 of the body of water 6, for example, at a depth of about 25 meters or less. In alternative embodiments, the sensor streamer 14 may be towed at a deeper depth. For example, the sensor streamer 14 may be towed at a depth of up to about 50 meters or more. It should be noted that, while the present example shows four of the sensor streamer 14 (FIG. 1B), the present disclosure is applicable to any number of sensor streamers 14 towed by survey vessel 4 or any other vessel. For example, in some embodiments, two, three, four, five, or more of the sensor streamers 14 may be towed by survey vessel 4, and can be spaced apart laterally, vertically, or both laterally and vertically.

During operation, certain equipment (not shown separately) in the recording system 8 may actuate the seismic source 12 at selected times. In seismic surveying, actuation of the seismic source 12 should cause seismic energy to emit from the seismic source 12 with a seismic signal propagating downwardly through the body of water 6 and into one or more formations 18 below the water bottom 19. A modified seismic signal that is reflected by the formations 18 may be detected by the seismic sensors 10 as the modified signal travels upwardly through the body of water 6. The seismic sensors 10 may generate response signals, such as electrical or optical signals, in response to the modified seismic signal.

The detected signal and/or fields may be used to infer certain properties of the formations 18, such as structure, mineral composition and fluid content, thereby providing information useful in the recovery of hydrocarbons, for example.

In accordance with example embodiments, a geophysical data product indicative of certain properties of the one or more formations 18 may be produced from the detected signal. The geophysical data product may include acquired and/or processed geophysical data (e.g., seismic data, geophysical data) and may be stored on a non-transitory, tangible, computer-readable medium. The computer-readable medium may include any computer-readable medium that is tangible and non-transitory, including, but not limited to, volatile memory, such as random access memory (RAM) and non-volatile memory, such as read-only memory (ROM), flash memory, hard disc drives, optical disks, floppy discs, and magnetic tapes. The geophysical data product may be produced offshore (e.g., by equipment on a vessel) or onshore (e.g., at a facility on land) either within the United States and/or in another country. Specifically, embodiments may include producing a geophysical data product from at least the measured acoustic energy (or fields) and storing the geophysical data product on a tangible, non-volatile computer-readable medium suitable for importing onshore. If the geophysical data product is produced offshore and/or in another country, it may be imported onshore to a facility in the United States or another country. Once onshore in, for example, the United States (or another country), further processing and/or geophysical analysis may be performed on the geophysical data product.

Figure 2:
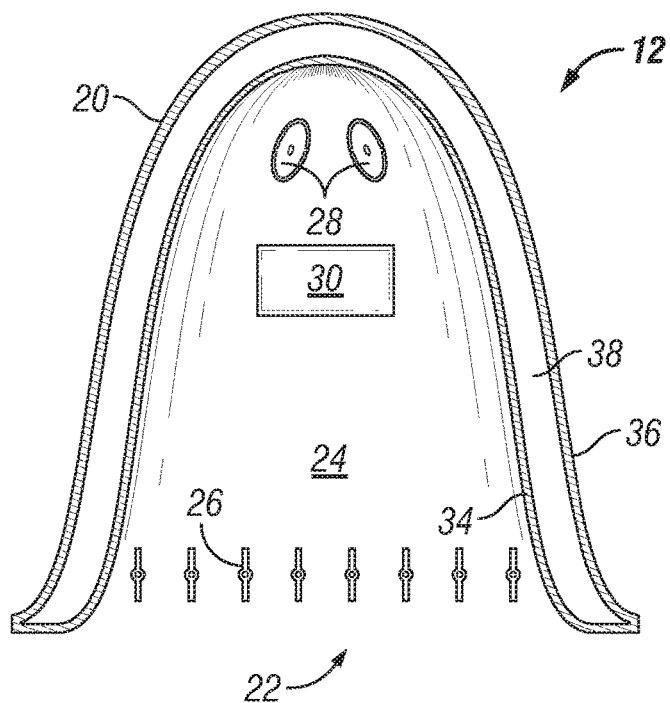
FIG. 2 illustrates a cross section of a seismic source according to an example embodiment of the present disclosure.
Figure 3:
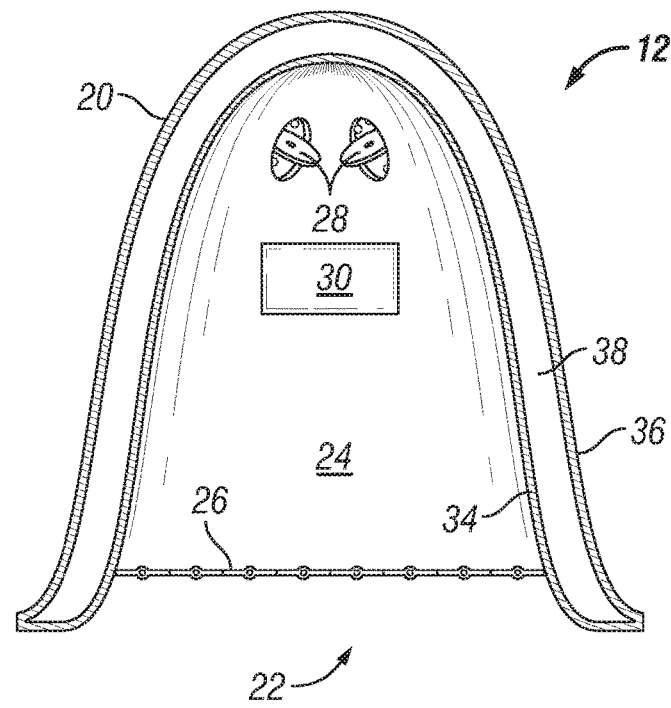
FIG. 3 illustrates a cross sectional view of a seismic source in accordance with some embodiments of the present disclosure.

FIGS. 2 and 3 illustrate a cross section of seismic source 12 according to example embodiments of the present disclosure. As illustrated, seismic source 12 may include a wave generator 30 positioned with a housing 20. The wave generator 30 may include any suitable generator of seismic waves for seismic surveying. According to some embodiments, the wave generator 30 may include an air gun or an array of air guns. Air guns may include one or more pneumatic chambers that can be pressurized with compressed gas (e.g., air) which can be released to generate a pulse of seismic energy. It will be appreciated that that other suitable generators may be used as the wave generator, such as water guns and marine acoustic vibrators. For air gun embodiments, the wave generator 30 may have any suitable volume. For example, wave generator 30 may be sized to occupy a range of volumes from about 56 cubic inches (0.9 liters) to about 600 cubic inches (9.8 liters) or from about 300 cubic inches (4.9 liters) to about 600 cubic inches (9.8 liters). While only a single wave generator 30 is shown, it should be understood that an array of wave generators 30 may be positioned within the housing 20 in accordance with additional embodiments (not shown). The location of the wave generator 30 within the housing 20 may be tuned, for example, to facilitate a desired bubble expansion and/or focusing of generated seismic waves. By way of example, the wave generator 30 may be positioned in an upper portion of the housing 20. In some embodiments, the wave generator 30 may be positioned within an upper third or an upper quarter of the housing 20.

As shown, example embodiments of the housing 20 may have a generally conical shape including an inverted cone. In some embodiments, the generally conical shape is referred to as an inverted cone because, when viewed from the side, the base of the housing 20 is wider than the upper portion of the housing 20 as shown in FIGS. 2 and 3. It will be appreciated that the shape of the housing 20 may be tuned to optimize bubble expansion within the housing 20 to produce a segment of a spherically diverging wavefield. Embodiments of the present disclosure are not limited to a housing 20 having a shape of an inverted cone. In general, embodiments may include Some embodiments of the present disclosure may include a hyperbolic cone housing shape, which may provide certain wave front attributes. Other embodiments according to the present disclosure may include a trumpet-shaped cone housing chamber, which may provide for certain water displacement attributes. Additionally, one or more inner surfaces (e.g., inner wall 34) of the housing 20 may be contoured to guide bubble expansion. Embodiments of the housing 20 may be large enough to contain various expanded air volumes. By way of example, housing 20 may have a volume of between 150 L to 1000 L.

The housing 20 may be configured in a range of sizes and aspect ratios. According to some embodiments of the present disclosure, the housing 20 height may be in a range of from 1 meter to 2.5 meters while the corresponding base diameter may be in a range of from 0.5 meters to 2 meters. It will be appreciated that for some seismic operations, the housing 20 may have a height of 1.5 meters and a base diameter of 1 meter. As with housing shape, a wide variety of aspect ratios and ranges may be used for the housing 20.

Housing 20 may include a bottom portion having the open end 22 and an internal chamber 24 in which the wave generator 30 may be disposed. The chamber housing may further include baffles 26 positioned between the wave generator 30 and the open end 22. In some embodiments, the baffles 26 are devices used to control the flow of seismic waves from the open end 22 of the housing 20. As illustrated, the baffles 26 may be positioned at the bottom portion of the housing 20. However, baffles 26 may be otherwise positioned in the housing 20, for example, to control egress of seismic waves generated by the wave generator 30 from the housing 20. The baffles 26 may include a plurality of blades with ends shaped to fit the dimensions of the housing 20. The blades may be configured to be rotated around a long axis of the internal chamber 24 (e.g., like the rotating part of a butterfly valve). In operation, the baffles 26 may be actuated to completely or partially seal the lower portion of the housing 20 to control or partially control seismic wave energy from the wave generator 30. For example, the baffles 26 may be operable to rotate from an open position to a closed position. The open position is illustrated on FIG. 2. In the open position, the baffles 26 allow egress of seismic wave energy from the wave generator 30. The closed position is illustrated on FIG. 3. In the closed position, the baffles 26 seal (or partially seal) the open end 22 of the wave generator 30.

In some embodiments, the housing 20 may further include vents 28. As illustrated, the vents 28 may be positioned in the upper portion of the housing 20 to control the discharge of air. By way of example, the vents 28 may be positioned in the housing 20 above both the wave generator 30 and baffles 26. According to some embodiments, the vents 28 may be butterfly valves or slide valves. In some embodiments, the vents 28 may include long flat blades, for example, similar to baffles 26. While FIG. 2 illustrates two of the vents 28, it should be understood that more or less vents may be used.

It will be noted that the baffles 26 are shown in an open position in FIG. 2 and in a closed position in FIG. 3. Conversely, the vents 28 are shown in a closed position in FIG. 5D and in an open position in FIG. 5E. In operation, the baffles 26 may be in an open position during actuation of the wave generator 30 to allow egress of seismic waves from the housing 20. For example, air bubble generated by the wave generator 30 may exit through the open end 22 with the baffles 26 in an open position. The vents 28 may be in a closed position, as shown on FIG. 3, while the baffles are open. To control excessive bubble reverberations after actuation, baffles 26 may work in conjunction with vents 28. According to some embodiments, baffles 26 are positioned at the open end 22 of the housing 20 and may be rotated into a closed position (e.g., shown on FIG. 3) as the bubble approaches the end of the recompression. In operation, vents 28 located at the top of the housing 20 in the inner chamber are opened as the baffles 26 are closed. Accordingly, in such an arrangement of vents 28 and baffles 26, as one or more bubble starts to re-expand, the bubbles and associated air may exit through the vents 28 at the upper portion of the housing 20. Vents 28 and baffles 26 may be operated passively, or actively by actuators, motors, or other suitable mechanism.

Figure 4:
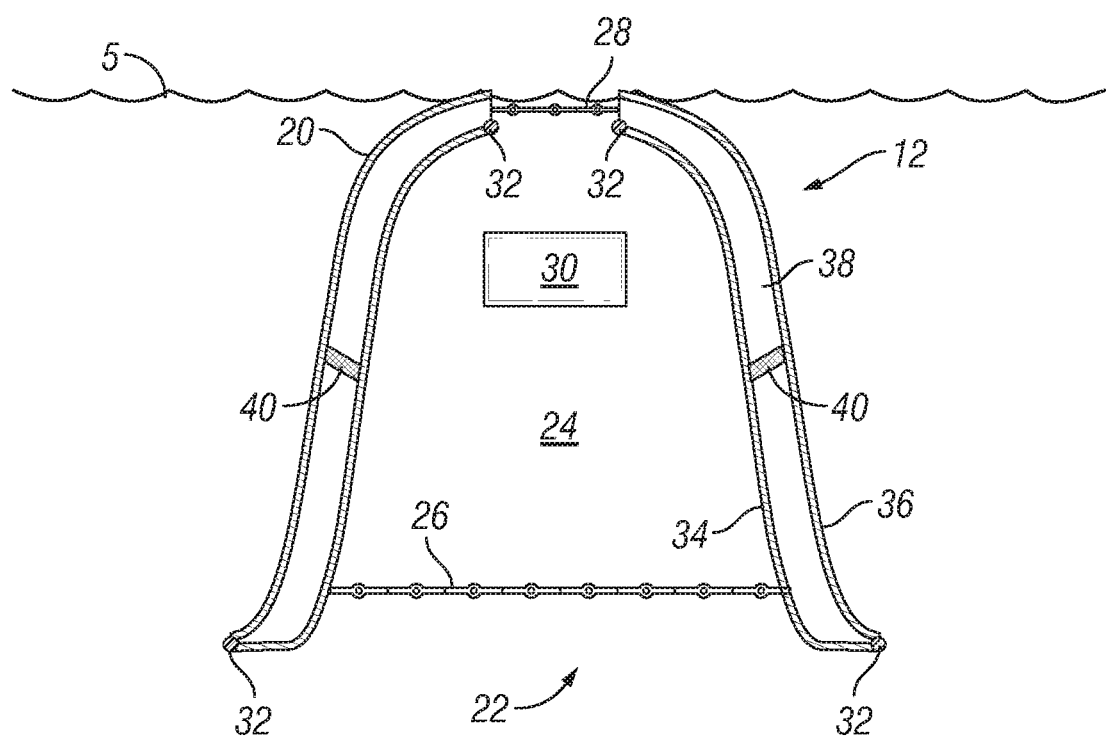
FIG. 4 illustrates a cross sectional view of a seismic source in accordance with some embodiments of the present disclosure.

FIG. 4 illustrates a cross-sectional view of a seismic source 12 in accordance with another embodiment of the present disclosure. As illustrated, housing 20 additionally may include a seat 32 that is positioned between an inner wall 34 and an outer wall 36 of the housing 20. In some embodiments, the seat 32 includes an acoustic dampening material disposed at the intersection of the inner wall 34 and the outer wall 36 to reduce propagation of sound energy therebetween. In other words, the seat 32 may be positioned to at least partially acoustically isolate the inner wall 34 from the outer wall 36 such that side propagation of sound energy from the sound source 12 is reduced. For example, by positioning between the inner wall 34 and the outer wall 36, the seat 32 may prevent and/or reduce sound energy from traveling along inner wall 34 to outer wall 36. The seat 32 may include rubber, foam, or other like materials. The seat 32 may generally surround and follow along at least a lower peripheral portion of the housing 20. As shown in FIG. 4, the seat 32 is positioned below the baffles 26 and surrounds the periphery of the housing 20. Additionally, seat 32 may be positioned along the entirety of the inner periphery of the housing 20, or only a portion of the inner periphery, or not at all. According to other embodiments, one or more seats 32 may also be used around the upper portion of the housing 20 at or near the vents 28.

In some embodiments, the inner wall 34 and the outer wall 36 may form a sealed vacuum cavity 38. Vacuum cavity 38 may also reduce side propagated sound energy upon activation of the seismic sound source. In some embodiments, the vacuum cavity 38 may be used in conjunction with the seat 32 to reduce side propagated sound energy. It should be understood that of the term "vacuum" with respect to vacuum cavity 38 is not intended to imply that the vacuum cavity 38 is a perfect vacuum but is instead intended to imply that the space within the vacuum cavity 38 is a partial vacuum with a pressure lower than atmospheric pressure, for example, a medium vacuum between 25 to $1 \times 10^{-3}$ Torr. Construction materials for the inner and outer walls may be plastic, metal, carbon fiber or some other high rigidity material.

With continued reference to FIG. 4, the seismic source 12 may be positioned along the sea surface 5 to reduce surface reflections and ghosts. In some embodiments, the seismic source 12 may be positioned within 10 meters, within 5 meters, within 1 meter, or even closer to the sea surface 5. As shown, seismic source 12 may include a wave generator 30 positioned in a housing 20. In the illustrated embodiment, the housing 20 includes a vacuum cavity 38 formed by inner wall 34 and outer wall 36. In some embodiments, wall supports 40 may be provided. By way of example, the wall supports 40 may oppose the vacuum forces and maintain a separation between the inner wall 34 and outer wall 36. The housing 20 may include seats 32, such as rubber or other pliable material, positioned near the bottom portion of the housing 20, for example, to reduce vibration transfer from the inner wall 34 to the outer wall 36. In some embodiments, seat 32 may be positioned at a joint between inner wall 34 and outer wall 36 of the vacuum cavity 38 to reduce or eliminate the transfer of vibrations between the surfaces. As shown, seats 32 are additionally positioned near the upper portion of the housing 20. The housing 20 may include baffles 26 and vents 28. Baffles 26 and vents 28 may be similar in structure and function to those described with respect to FIGS. 2 and 3. However, as shown on FIG. 4, vents 28 may be in the form of long, flat blades similar to baffles 26.

Referring now to FIGS. 5A to 5F, operation of the seismic source 12 will now be described with respect to some embodiments of the present disclosure. As illustrated, the seismic source 12 may include a wave generator 30 positioned in a housing 20. The housing 20 may include an open end 22 with baffles 26 positioned at a lower portion of the housing 20 between the open end 22 and the wave generator 30. Vents 28 may be positioned in an upper portion of the housing 20 opposite of the baffles 26 positioned in a lower portion of the housing 20. FIG. 5A shows a seismic source 12, such as one or more air guns firing with the vents 28 in a closed position while the baffles 26 are in an open position. As illustrated, the seismic source 12 generates an air bubble 44. FIG. 5B shows expansion of the air bubble 44 down the housing 20 with the vents 28 closed and the baffles 26 open. The air bubble should continue to expand in the seismic source 12 with FIG. 5C showing air bubble 44 at its maximum size in the seismic source 12. As illustrated, the vents 28 remain closed and the baffles 26 remain open during expansion of the air bubble 44. As will be appreciated, as the air bubble 44 is discharged from the seismic source 12 a seismic wave that travels from the seismic source 12, for example, to a water bottom 19 (e.g., FIG. 1) as previously described. FIG. 5D shows recompression of the bubble 44 to form a recompressed bubble in housing 20 with the vents 28 closed and the baffles 26 open. FIG. 5E shows the bubble 44 near full recompression with the vents 28 open and the baffles 26 closed to allow egress of the bubble 44 out of the housing 20 through the vents 28. FIG. 5F shows smaller bubbles 42 re-expanding out of the housing 20 with the vents 28 open and the baffles 26 closed. By operation of the seismic source 12 with control of the baffles 26 and vents 28, side propagated sound energy may be reduced by addressing bubble behavior by selectively opening and closing the baffles 26 and vents 28 during operation of the wave generator 30. Through control of the baffles 26 and the vents 28, the bubble 44 after regeneration can be expelled through the vents 28 instead of sound energy that can pass through the housing 20. In addition, the seat 32 (e.g., as shown in FIG. 4) may also serve to dampen and further reduce side propagated sound energy from the wave generator 30 when used with sound source 12 in conjunction with vents 28 and baffles 26.

Figure 6A:
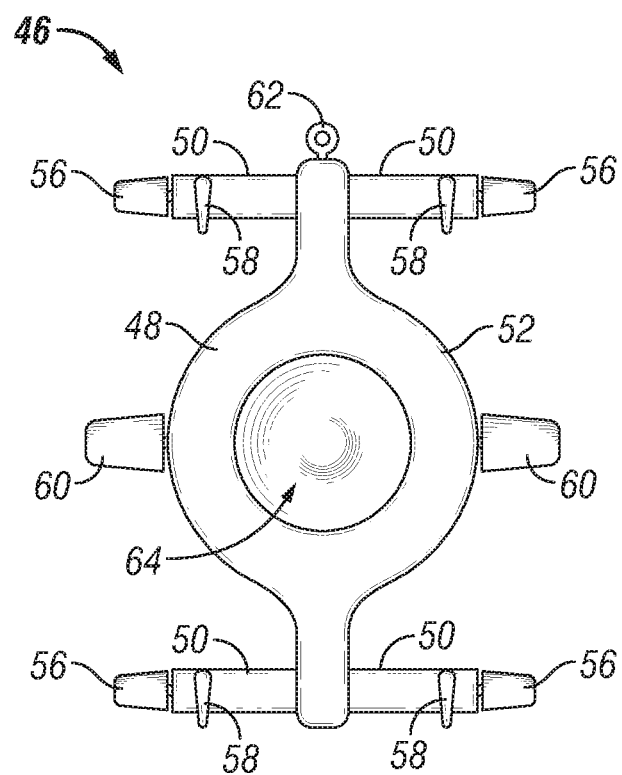
FIGS. 6A and 6B show top and perspective views, respectively, of a cradle assembly for housing a seismic source according to some embodiments of the present disclosure.
Figure 6B:
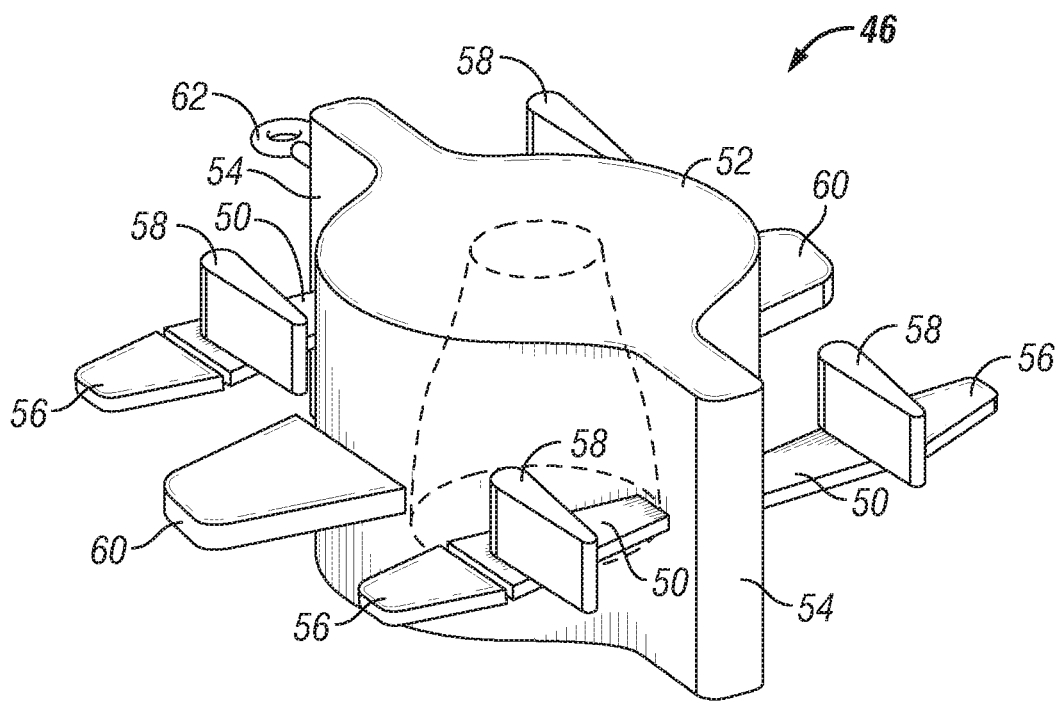

FIGS. 6A and 6B illustrate a cradle assembly 46 in accordance with embodiments of the present disclosure. The cradle assembly 46 may be configured to house the seismic source 12 (e.g., shown on FIGS. 1-4) while maintaining a position and/or orientation of the seismic source 12 while towed. As illustrated, the cradle assembly 46 may include a body 48 and one or more wings 50. Body 48 may include a central portion 52 with extensions 54 from opposing sides of the central portion 52. Central portion 52 may include a receptacle 64 to fully or partially receive the seismic source 12. In other embodiments, the seismic source 12 may be unitary with receptacle 64. In the illustrated embodiment, a pair of the wings 50 extend laterally from both of the extensions 54. A plurality of devices may be used on the cradle assembly 46 for controlling depth, lateral steering, and/or force compensation. For example, depth fins 56 may extend from ends of the wings 50 and may be operated to adjust depth of the cradle assembly 46. Depth fins 56 may also be operated to level the cradle assembly 46. By way of further example, lateral steering fins 58 may also extend from the wings 50. As illustrated, the lateral steering fins 58 may extend vertically from the wings 50. The lateral steering fins 58 may be operated to control lateral positioning of the cradle assembly 46. By way of further example, the cradle assembly 46 may also include force compensation fins 60. As illustrated, the force compensation fins 60 may extend from opposite sides of the central portion 52. The force compensation fins 60 may operate to apply downward force to the cradle to compensate for the upward force exerted by the initial air expansion. The cradle assembly 46 may also include a tow point 62, which may secure the cradle assembly 46 to the source cable 11 (e.g., FIGS. 1A and 1B).

The particular embodiments disclosed above are illustrative only, as the described embodiments may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this disclosure.

What is claimed is:

1. An apparatus for generation of seismic waves in a body of water, comprising:
   a housing defining an internal chamber having an open end in a bottom portion of the housing, wherein the housing comprises:
   baffles positioned proximate the open end; and
   a vent positioned at a top of the housing; and
   a wave generator disposed within the internal chamber of the housing and in a position between the baffles and the vent.

2. The apparatus of claim 1, wherein the housing comprises an inner wall and an outer wall that form a sealed vacuum cavity around the internal chamber.

3. The apparatus of claim 1, wherein the wave generator comprises an air gun.

4. The apparatus of claim 1, wherein the wave generator comprises a water gun or a marine acoustic vibrator.

5. The apparatus of claim 1, wherein the housing has a shape of an inverted cone, a hyperbolic cone, or a trumpet-shaped cone.

6. The apparatus of claim 1, further comprising a seat positioned between an inner wall and an outer wall of the housing.

7. The apparatus of claim 1, wherein the baffles comprise one or more blades configured rotate around a long axis of the internal chamber from an open position to a close position that at least partially seals the open end.

8. The apparatus of claim 1, wherein the vent comprises one or more butterfly valves, one or more slide valves, or some combination thereof.

9. The apparatus of claim 1, further comprising a cradle assembly for holding the housing with the wave generator.

10. The apparatus of claim 9, wherein the cradle assembly comprises a body and one or more fins positioned around the body.

11. The apparatus of claim 1, wherein the housing comprises an inner wall and an outer wall that define a sealed vacuum cavity around the inner chamber, wherein the housing has a larger width at the open end than at an upper portion opposite the open end, and wherein the wave generator comprises an air gun.

12. A method for geophysical surveying, comprising:
    towing a seismic source in body of water, wherein the seismic source comprises a wave generator positioned within an internal chamber of a housing, wherein the internal chamber has an open end in a bottom portion of the housing;
    actuating the wave generator such that a seismic signal is emitted from the seismic source through one or more baffles in the housing, wherein the one or more baffles are positioned proximate the open end;
    closing the one or more baffles; and
    opening one or more vents positioned at a top of the housing such that one or more recompressed bubbles formed in the housing are released through the one or more vents.

13. The method of claim 12, wherein the one or more comprise one or more butterfly valves, one or more slide valves, or some combination thereof.

14. The method of claim 12, wherein actuating the wave generator comprises releasing compressed air from the wave generator.

15. The method of claim 12, wherein the housing comprises a vacuum cavity to direct a seismic wave down the housing through the one or more baffles.

16. The method of claim 12, further comprising: detecting a modified seismic signal after interaction of the modified signal with one or more formations below a water bottom; obtaining geophysical data from the modified seismic signal; and processing the geophysical data to produce a geophysical data product.

17. An apparatus for generation of seismic waves in a body of water, comprising:
    a seismic source comprising:
      a housing comprising:
        an inner wall defining an internal chamber, the internal chamber having an open end in a bottom portion of the housing;
        an outer wall spaced apart from the inner wall to define a vacuum cavity therebetween;
        a vent positioned at a top of the housing; and baffles positioned in the internal chamber proximate the open end; and an air gun disposed within the internal chamber of the housing and in a position between the baffles and the vent; and a cradle assembly that holds the seismic source.

19. The apparatus of claim 17, wherein a seat is positioned in a joint between the inner wall and the outer wall, wherein the seat is comprised of pliable material.

19. The apparatus of claim 17, wherein the cradle assembly comprises a body and one or more fins positioned around the body.

20. The apparatus of claim 17, wherein the cradle assembly comprises a tow point for securing the seismic source to a source cable.

\* \* \* \* \*